United States Patent [19]
Weber

[11] 4,196,391
[45] Apr. 1, 1980

[54] METAL LOCATOR WITH STEREOTONIC INDICATION OF TRANSLATERAL POSITION

[76] Inventor: Harold J. Weber, 20 Whitney Dr., Sherborn, Mass. 01770

[21] Appl. No.: 900,988
[22] Filed: Apr. 28, 1978
[51] Int. Cl.² ............................................. G01V 3/10
[52] U.S. Cl. ...................................... 324/328; 331/38
[58] Field of Search ...................... 324/3, 5, 67, 79 R, 324/236; 331/37, 38, 64, 65; 340/551

[56] References Cited
U.S. PATENT DOCUMENTS

| | | | |
|---|---|---|---|
| 2,393,717 | 1/1946 | Speaker | 324/236 X |
| 3,492,564 | 1/1970 | Baker | 324/67 X |
| 3,519,929 | 7/1970 | Ault | 324/79 R |
| 3,823,365 | 7/1974 | Anderson | 324/236 |

Primary Examiner—Gerard R. Strecker

[57] ABSTRACT

A metal locator apparatus the preferred practice of which includes two electromagnetic field radiating inducers, which serve to act upon a metal object deposited in a covert medium from distinctly separate positions, including two separate search oscillators one of which is connected to each of the inducers thereby producing two output signals, each of which include distinctive frequency perturbations introduced by the proximal relationship of the metal object with the responsive inducer. The two signals are then each individually combined, or mixed with a common beat oscillator which action results in two output sets of sum and difference frequencies. By way of suitable filtering, the two difference frequencies come out as distinctly separate audio frequency signals the pitch of which fluctuates in direct accordance with the frequency perturbations appearing on the individual search oscillator combinative signals. The two thus produced audio difference frequencies are amplified, whereupon they serve to drive two sensory indicators, for example a dual headset arrangement, whereby a stereotonic or otherwise multisensible positional indicative signal is conveyed to an operator which will serve to narrowly localize the concealed object. Pronounced improvement in the average operator's ability to differentiate between subtle, or slight, differences in the indicative audio frequencies is brought forth in the locator through the use of a very low, subaudible frequency which operates so as to switch the sensory indicators alternatingly back and forth between the audio difference frequencies thereby enhancing the recognition of even slight pitch differences.

10 Claims, 11 Drawing Figures

METAL LOCATOR WITH STEREOTONIC INDICATION OF TRANSLATERAL POSITION

SUMMARY

My invention relates to a metal locator, and more specifically, to a beat frequency detector type of locator. In the usual form for such a detector, which is well known in the art, a search oscillator is provided wherein the tuned circuit therefor includes an inducer, or loop antenna, which is a dimensionally relatively large open wound coil, say for example, ten inches in diameter. A separate beat oscillator is included wherein the tuned circuit is maximized for intrinsic stability. The signals provided by each the search oscillator and the beat oscillator serve to input a mixer, or heterodyne detector, whereby at least a difference frequency issues from the mixer output. When the search and beat frequencies are suitably close in frequency the resultant frequency will be an audio frequency tone. Since the search oscillator is said to have a large, open wound coil, in practice this coil is caused to be moved about until a metal object enters the inductive field which emanates from the coil as excited by the search oscillator. The result is the object will alter the field, say the inductance, and thereby cause the search oscillator frequency to somewhat change, or pertubate. The nearer the axis of the search coil is to the metal object, generally the stronger, or more pronounced the frequency shift will be. The result is the audio tone at the mixer output will shift pitch in proportion to the search oscillator shift. This audio tone is amplified and in usual practice, serves to drive a loudspeaker, or else a headphone. Thereby a relative monotonic indication is provided to the operator that some object is near.

My instant invention provides significant improvement in that not only one, but at least two separate search oscillators including individually separate inducers, or loop antennae are provided. The inducers are each arranged to provide an overlapping but noncoincident spatial displacement with respect to each other. That is to say that in all but one point on either side of the plane of the said inducers, a metal object will have a determinately different effect on the frequency of one search oscillator as what it does on the other. The search oscillator outputs are each caused to drive a separate mixer means, with the second input of the mixer means being provided by a single common beat oscillator. What results is a separate, generally distinctively different audio tone in the output of each mixer. The individual tones are subsequently independently amplified and, preferably, coupled one to each headphone comprising a sterophonic, a binaural, headset thereby producing a sensory positional indication in the form of a distinctive stereotonic signal to an operator. The strength of my invention is for a goodly part to be found in the novelty provided by the multiple search oil, search oscillator arrangement combined with separate mixer and audio channels whereby, usually at least, a left and a right hand auditory indication is provided the operator whereby the pitch thereof will be best matched when the operator has the multiplicity of search coils individual axes arranged in equidistant proximateness with respect to the metal object.

The primary object of my present invention is to provide a metal locator which will provide an operator with at least a separate right hand and left hand indication of the alignment of the combinative search coil, or inducer arrangement, with respect to the location of a covert metal object.

Still another object of my present invention is to describe an arrangement of several inducers so as to form a search coil means which provides overlapping, yet noncoincident, field line extensions.

Still a further object of my present invention is to describe an arrangement of several search oscillators, including a means for balancing the natural operating frequencies thereof.

Yet another object of my present invention is to describe an arrangement for deriving right hand and left hand indicative signals.

Still a further object of my present invention is to describe means for developing a position indicative stereotonic audio signal.

Still another object of my present invention is to describe apparatus for localizing the presence of a metal-like object in the presence of a covert medium and providing at least two proximity signals therefrom to guide an operator to the object in a most expeditious manner.

These and other objects and advantages of my instant invention will become apparent and better understood when the following description is considered as taken together with the accompanying drawings.

DESCRIPTION OF INVENTION

Figure 1:
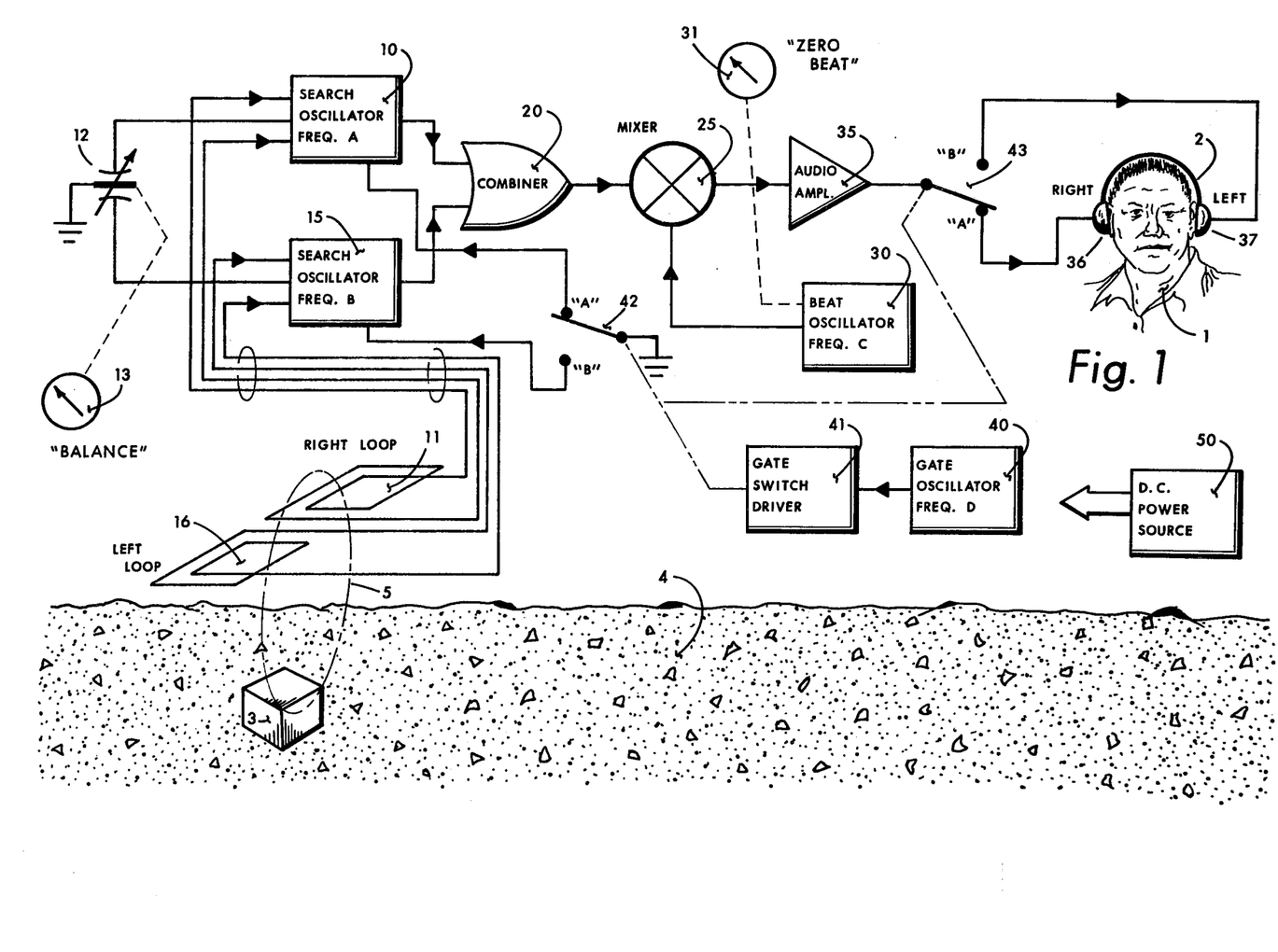
FIG. 1 Block diagram showing relationship of bifrequency search oscillator inducers, detection means, and operator indicant.

FIG. 1 provides a block diagram illustrative of the functions included in one preferred embodiment of my instant invention. A first frequency "A" search oscillator 10 is shown in combination with a first inducer loop, or electromagnetic field effector, 11, whilst a second frequency "B" search oscillator 15 is shown in combination with a second inducer, or field effector, 16. The positions of the two radiant energy field emitting means, or inducers 11, 16 are shown to be noncoincident, but adjacent to each other, arranged in axes dissimilitude so as to provide an overlapping inducer field 5 which interacts with the metal object 3 as concealed in covert medium 4. For illustrative purpose, the object 3 is shown to be a metal box buried in soil 4.

The search oscillators 10, 15 will be caused to operate at predefined frequencies which are in part determined by the inductance of respective inducers 11, 16. Therefore any interaction of the metal object on either, or for that matter both, of the inducer fields will result in a deviation in the instantaneous periodicity of the associated oscillator by an amount which is proportionate to the said interaction. A "balance" adjustment 13 in the form of a differentially controlled variable capacitor 12 is provided which serves to adjust both search oscillators to nearly the same frequency when the inducers are in no near proximity of any metal object.

The outputs of the first frequency search oscillator provides one input to a combiner 20, whilst the second frequency search oscillator provides a second combiner 20 input. The combiner 20 output serves to couple to the signal, or first input port in a heterodyne detector, or mixer, 25 which together with a third frquency "C" beat oscillator signal 30 coupled to the second input port, causes the mixer 25 is yield, or produce, principally sum and difference beat note product frequency outputs therefrom. The sum frequency is quenched, while the difference frequency is inputed to an audio amplifier 35. Therefore the mixer output, when combining the first and common third frequency signals, will yield a fourth frequency signal output therefrom. Accordingly, the mixer output, when combining the second and common third frequency signals, will yield a fifth frequency signal output therefrom. The audio amplifier is responsive to both the fourth and fifth frequencies, in the connection shown in FIG. 1.

A significant novelty exists in my instant invention through the inclusion of a sixth frequency signal "D" gate oscillator 40, which operates at a subaudible rate so as to control gate switch driver 41. The drive functions so as to operate representative switch means 42 which will alternatively cause first oscillator 10, or else second oscillator 15, to operate. Therefore the signal at the output of combiner 20 is alternating between the first frequency and the second frequency. The result is that the beat note output of mixer 25 is, in a like way, alternating between the fourth and the fifth difference frequency signals produced therefrom and accordingly applied to the input of amplifier 35.

The driver 41 also controls a representative switch means 43 connected to the output of amplifier 35. Switch 43 provides an "A" output serving to drive RIGHT earphone 36. Switch 43 provides also a "B" output serving to drive LEFT earphone 37. The two earphones, which are independently operated, form a part of a binaural headset 2 worn by an operator 1. This connection will provide the operator 1 with a stereotonic indication as to the relative first and second search oscillator 10, 15 pertubations. With suitable frequencies, say by the way of example, 120 kilohertz for the first and second frequencies "A" and "B", say 120.1 kilohertz for third frequency "C", the result will be about 100 hertz for the fourth and fifth mixer product difference frequencies. Say now that an object 3 enters the field of RIGHT loop 11 more favorably than LEFT loop 16, such that the first frequency oscillator 10 deviates so as to operate at a new first frequency of, say, 119.7 kilohertz, whilst not so strongly influenced second frequency oscillator 15 operates at a new second frequency of, say, 119.9 kilohertz. The mixer output issue under this condition will be a fourth frequency of about 400 hertz, whereas the fifth frequency will be a pronouncedly different periodicity of about 200 hertz.

Therefore the operator 1 will, because of switch 43 action, receive a sterotonic signal the pitch of which will be audibly different for each ear thereby producing a guidance signal conveying to him the indication that the RIGHT loop 11 must be nearer the object 3 than the LEFT loop 16. The operator may further enhance the tracing resolution through manipulation of the "zero beat" control 31 which serves to vary the common third frequency signal periodicity, the effect of which is a like change of the pitch of both the fourth and fifth frequencies as the "zero beat" adjustment is made. As in the just recited example, if the "zero beat" control were to be adjusted somewhat so as to reduce the fifth frequency to near zero beat, or zero hertz, the fourth frequency would become 200 herz. In practice, reducing to a true zero beat is of little value since it is inaudible, but to adjust to a near zero beat condition can provide a considerable apparent enhancement of the locator's spotting ability, or resolution. Restating the just mentioned example, if the fifth frequency were reduced, by means of the zero beat control, from 200 hertz to a yet audible 25 hertz, the fourth frequency would accordingly be reduced from 400 hertz to a lower 225 hertz. This provides considerably better tone discrimination even for an operator afflicated with some measure of tone deafness, because the stereotonic tone ratio is 9:1, instead of only 2:1 as in the original example. The operator will receive the tones as being alternatively applied to the RIGHT and LEFT ear by the switch 43 as driven at a slow periodic rate, say 1 or 2 hertz, by sixth frequency gate oscillator 40. The restatement of the several important novel aspects of my invention particularly includes the differentially effected capacitance "balance" control 12, the simultaneous "zero beat" adjustment 31, and the alternating action between the RIGHT and LEFT responsor means.

The inclusion of a sixth frequency oscillator 40, together with the driver 41 and switch means 42, 43 is advantageous to the practice of my invention, that practice being to provide at least two separate electromagnetic field emitting means 11, 16 as described which cooperatively act upon at least two separate search oscillators 10, 15 so as to provide first and second signals therefrom which may be mixed with a third frequency so as to resultingly provide a separate fourth frequency audible signal being the difference of the said first and third frequency, and a separate fifth frequency audible signal, being the difference of the said second and third frequency.

I have been suprised to find that a pronounced improvement may be accomplished in the average operator's ability to differentiate between subtle tonal differences in the fourth and fifth frequency signals when the two signals are alternatively, rather than simultaneously, presented to the operator's ears. Such subtle tonal differences are reasonable to expect when using the apparatus to explore an object which is deeply concealed, of slight size, or of poor metal content. Therefore I say the stereotonic advantage of my invention may be improved upon even further through the use of alternant responsor gating. On the other hand I can show that the said sixth frequency oscillator 40, driver 41, and switch means 42, 43 may be dispensed with if a second mixer and a separate second audio amplifier is provided, without compromising the principal improvement I provide, that being, in the directional indication provided through plural search inducers and stereotonic indication.

Figure 2:
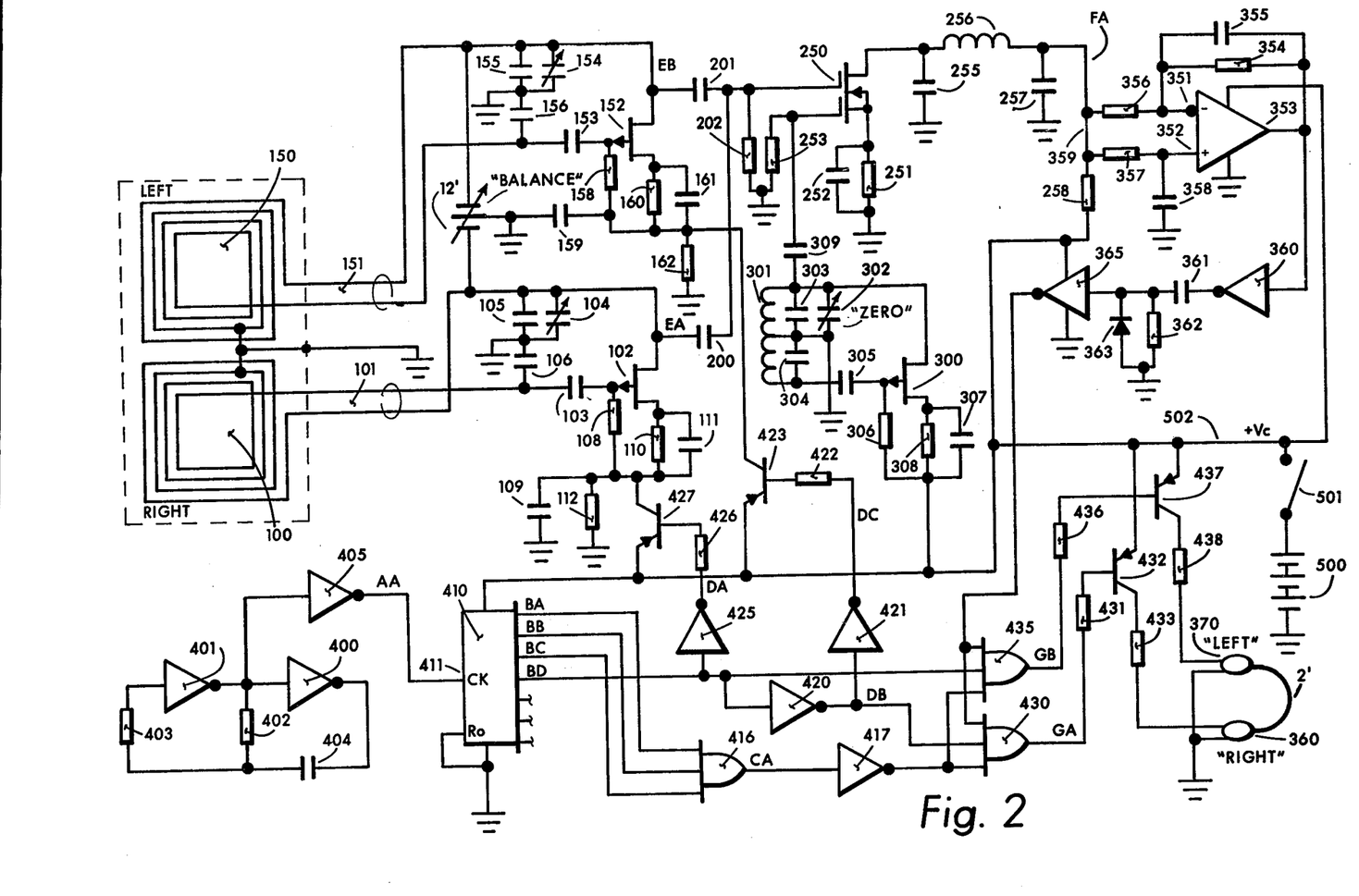
FIG. 2 Electrical diagram for one form of preferred embodiment.

FIG. 2 schematically shows a preferred embodiment of my new invention from which duplication thereof by an artisian might reasonably be expected. A RIGHT inducer 100 and a LEFT inducer 150 are shown connected 101, 151 to respective first and second frequency oscillator circuits. The RIGHT inducer first frequency oscillator consists of field effect transistor 102, say 2N4360, including gate capacitor 103 and gate leak 108. Tuning is provided by capacitors 104, 105, 106, connected in a well known Colpitts oscillator configuration. Resistor 110 and capacitor 111 provide source bias and bypassing action, whereas the radio frequency signal is outputed from the drain through capacitor 200. The LEFT inducer second frequency oscillator is similiar, including transistor 152, tuning capacitors 154, 155, 156, gate leak 158, gate capacitor 153, source resistor 160, and capacitor 161, together with drain connected output capacitor 201.

A differential capacitor 12', so to say a dual variable capacitor wherein the capacitance on one section decreases at the same rate as the capacitance on the second section increases, is provided to permit the initial operator balancing of the first and second frequencies to very nearly the same repetition rates before commencing exploration.

A heterodyne detector, or mixer, is provided for by dual gate field effect transistor (F.E.T.), for example R.C.A. type 40841, wherein the first and second signal frequencies are combinatively applied to a mixer input port consisting of one F.E.T. gate, including gate leak 202. A common third frequency signal is applied to the second mixer input port, or the second F.E.T. gate, including gate leak 253. The common third frequency signal is provided by a Colpitts oscillator comprising transistor 300, inductor 301, tuning capacitors 302, 303, 304, gate capacitor 305, gate leak 306, source resistor 308, capacitor 307, and drain connected output capacitor 309. Mixer mode bias is provided by source resistance 251, including bypass 252. The F.E.T. drain terminal forms the mixer output port, and thereby contains, through the action of heterodyne detection, the sum and difference frequencies in addition to the mixing frequencies. A low pass filter, formed by inductor 256 and capacitors 255, 257 blocks the flow of any but the low difference frequencies, say the fourth and fifth frequencies, to the input of an operational amplifier 353, say an R.C.A. type CA3140. The amplifier is connected as a zero-crossing detector which produces at the output thereof a succession of pulse-like signals in response to the fourth and fifth frequency components applied to the amplifier 353 inputs. Resistor 258 is the F.E.T. 250 drain resistor, so the two inputs 351, 352 of the amplifier will rest at an average D.C. value nearly that of the drain of F.E.T. 250. The superimposed A.C. signal, though, will be decoupled from the (+) input 352 by resistor 357 and capacitor 358. On the other hand the (−) input 351 will receive the A.C. waveform, so as the waveform on input 351 transistions above and below the average value on input 352, the amplifier will operate in a well known comparator mode and, thereby, drive the output between nearly ground and nearly $+V_c$. Resistor 354 sets the amplifier gain, thence the comparator sensitivity characteristics, whilst capacitor 355 slows the response. The detector 353 output drives an inverter 360, say type CD4069, which serves to drive a differentiator network 361, 362 including clamp diode 363 so as to produce on the input and accordingly on the output of inverter 365, a pulse signal with standardized pulse width, wherein the time duration is determined by the differentiator to be about one-half the reciprocal of the highest fourth or fifth tonal frequency provided by the mixer. The output of inverter 365 serves to input one line of triple input OR-gates 430, 435, say type CD4075.

Figure 3:
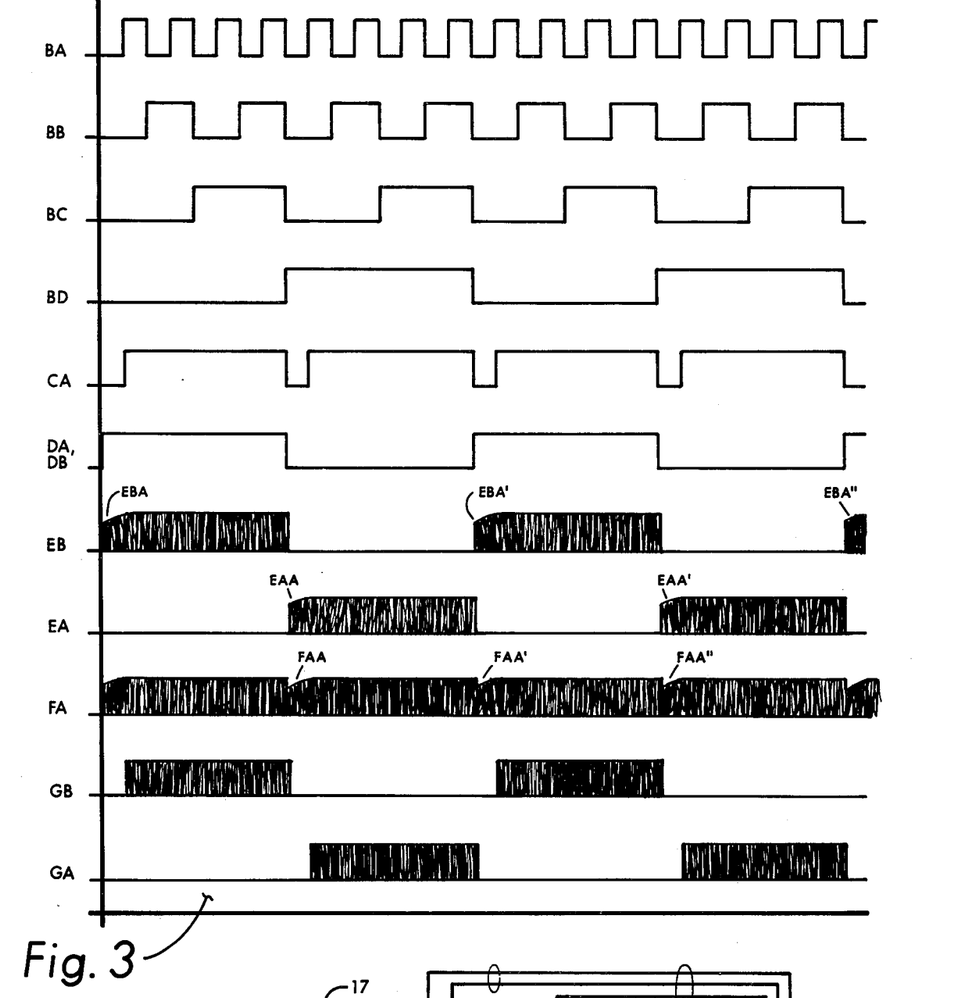
FIG. 3 Waveform representations for preferred embodiment.

A clock, or oscillator, for developing the sixth frequency gate signal is formed by a multivibrator comprising inverters 400, 401, timing resistor 402, timing capacitor 404, and balancing resistor 403. The so formed oscillator operates at a natural frequency eight times that of the sixth frequency, or else about 12 hertz. The output of inverter 401 also serves to drive a buffer inverter 405, the "AA" output of which drives the CK, or clock, input of binary counter 410, say type CD4024. FIG. 3 is referenced, in addition to FIG. 2, to show the BA, BB, BC, BD waveforms produced by the counter 410. The three input OR-gate 416 combines the BA, BB, BC counter 410 outputs so as to produce a CA signal which is active for 3½ clock cycles, and disabling for ½ clock cycle. The CA pulse is applied, through inverter 417, to parallel inputs of OR-gates 430, 435. The result is OR-gates 430, 435 will be inhibited every eighth clock half-cycle.

The counter BD output serves to drive inverters 420, 425 and OR-gate 435. The output DB of inverter 420 serves to drive inverter 421 and OR-gate 430. The BD output is alternatively logic "1", or else logic "0", for four out of every eight clock cycles applied to the counter 410 CK input, resulting in either OR-gate 430, or els 435, receiving an enabling signal on the respective input for four out of every eight clock cycles. The output DA of inverter 425 serves to drive PNP switch transistor 427, say 2N4126, when low, through resistor 426. The result is the $+V_c$ line 502 will be connected to the first frequency oscillator circuit including decoupling capacitor 109 and bleeder resistance 112.

In a like way the output DC of inverter 421 serves to drive PNP switch transistor 423 when low, through resistor 422. The result is the $+V_c$ line 502 will be connected to the second frequency oscillator circuit including decoupling capacitor 159 and bleeder resistance 162.

The purpose for the gating means described can be best understood by reference to FIG. 3 waveforms EA, EB, and FA appearing at key points in the FIG. 2 circuit. The start and stop, or gating action, of the first and second frequency oscillators produce respective waveforms EA and EB. The start of each oscillator is necessarily accompanied by a period of instability EAA, EAA', or else EBA, EBA', EBA". The mixer output FA will reflect these variations FAA, FAA', FAA", etc. which leads to an annoying "chirp" in the headphone audio signal. This chirp is eliminated in the OR-gates 430, 435 by way of said signal CA which disables the gate, thus the conveyance of the FA signal through the gate for one of every eight clock half-cycles, or else, about 12.5% of the first part of the fourth, or else the fifth frequency period as may be interpolated from the FA waveform. In practice this has been found effective in eliminating any vestige of chirp.

The output GA of gate 430 serves to drive PNP switch transistor 432, say 2N2906, the collector of which drives the RIGHT headphone 360 through volume limiting resistance 433. The outputs GB of gate 435 serves to drive PNP switch transistor 437, the collector of which drives the LEFT headphone 370 through volume limiting resistance 438.

A battery 500 provides operating power, for portable style operation, through disconnect means 501, thereby producing $+V_c$ level on line 502 so as to serve to energize the various oscillators, mixers, amplifiers, and logic comprising this form of the instant invention.

Figure 4:
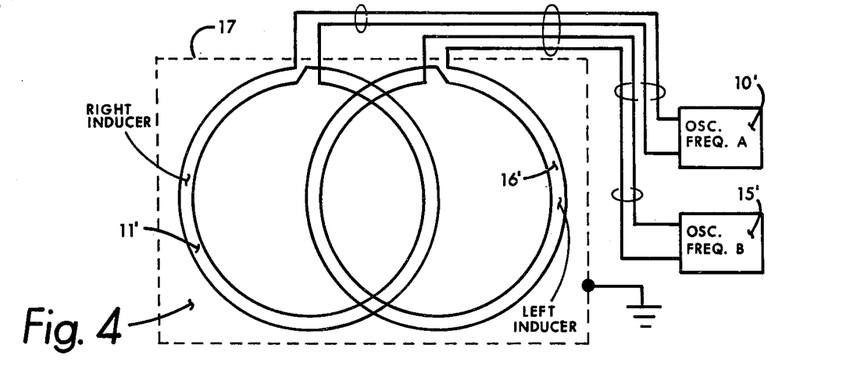
FIG. 4 A particular preferred embodiment for inducers.

FIG. 4 shows an inducer arrangement I have found particularly effective in exercising my invention. The arrangement of the RIGHT inducer 11' and the LEFT inducer 16' in such that the axis of one inducer, say 11', lies on the mean circumference of the windings comprising the second inducer 16'. Such an arrangement affords the least mutual coupling between the coils, therefore least interaction between the inducers, since the axis of one coil appears at a null position with respect to the field emanating from the second coil. Also shown is the use of a Faraday, or electrostatic, shield 17 the purpose for which is to minimize the effects of stray capacitance on the inducer resonance.

Figure 5:
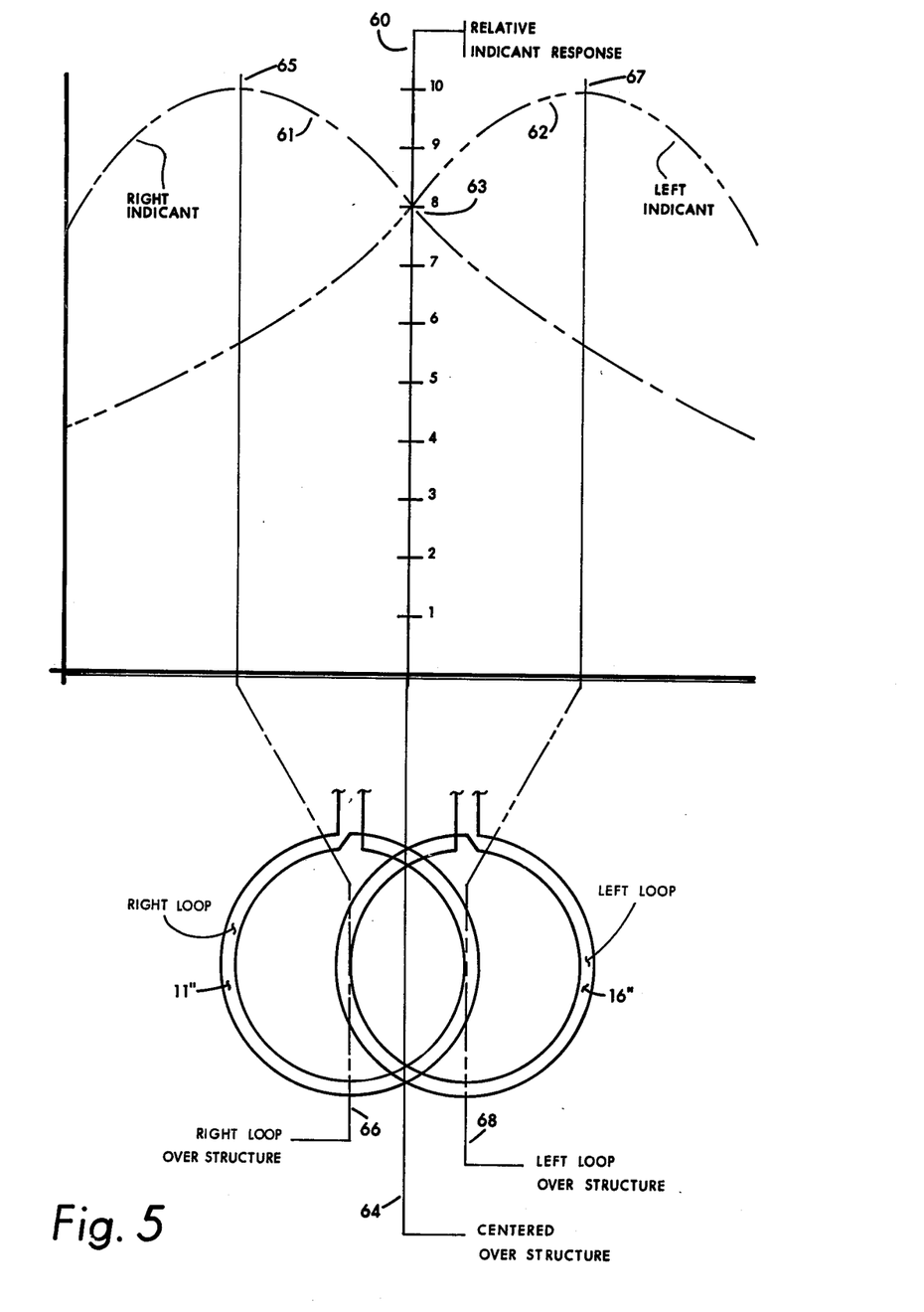
FIG. 5 Response representations for inducers in various relationships with covert object.

FIG. 5 shows graphically how the indicant responses, or more particularly, the left and right hand tone pitch varies with the concealed structure, or metal object, in several arrangements with respect to the pair of loop antennae. The "relative indicant response" aught to be interpreted as "audio pitch", which shows that, when right loop 11'' is centered over the structure 66, the right indicant response curve will reach a point 65 of maximum pitch deviation. The same condition is shown for the left inducer 16'' centered over the object 68 resulting in a maximum pitch deviation 67 on left indicant curve 62. When both inducers are equipositioned over the subject 64, the left and right indicant deviations are about equal 63. Thus the practitioner of my herein taught art can see how the tonal response is indicative of the inducer proximities with respect to the concealed object.

Figure 6:
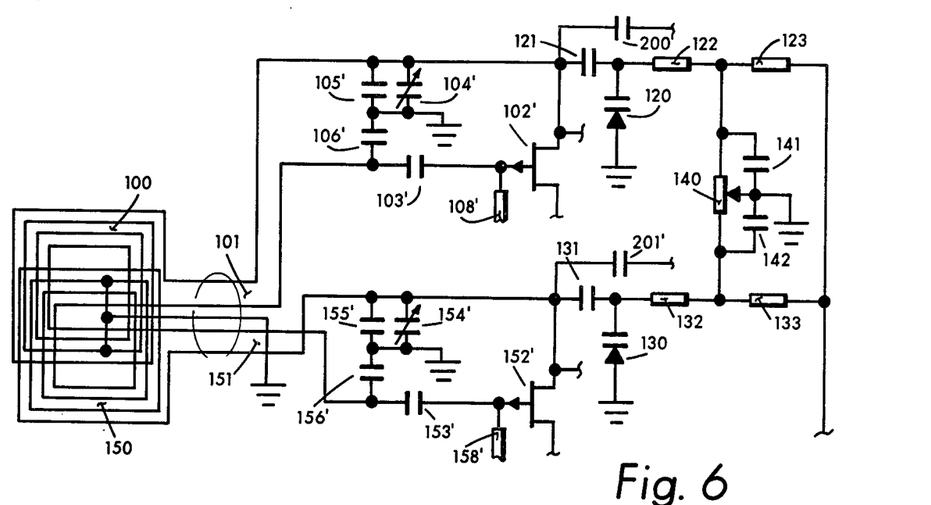
FIG. 6 Partial diagram showing implementation of tuning diodes for balance tuning.

FIG. 6 is a partial circuit including my said first and second frequency oscillators. What is shown is the use of a pair of voltage-variable capacitance diodes, say Motorola type MV-837, in a circuit configuration which will replace the said differential variable capacitor 12. The first frequency oscillator includes a variable capacitance diode 120, which is coupled to the oscillator transistor 102' drain through D.C. blocking capacitor 121. In a like way, the second frequency oscillator includes diode 130 and capacitor 131. A potentiometer 140 forms the bottom leg of a dual voltage divider including resistor 123 in one leg, while resistor 133 comprises the other leg. Resistors 122, 132 couple the D.C. level at the bleeder junction as reverse bias for respective diodes 120, 130. Therefore as the potentiometer 140 arm is varied, the bias voltage on one diode increases whilst that on the other diode decreases. The result is the diode capacitances change in a quasidifferential manner serving to balance the frequencies of the two oscillators. Bypass capacitors 141, 142 serve to decouple the potentiometer leads, permitting the noncritical mounting thereof some distance from either oscillator without introducing spurious behavior.

Figures 7, 8, 9:
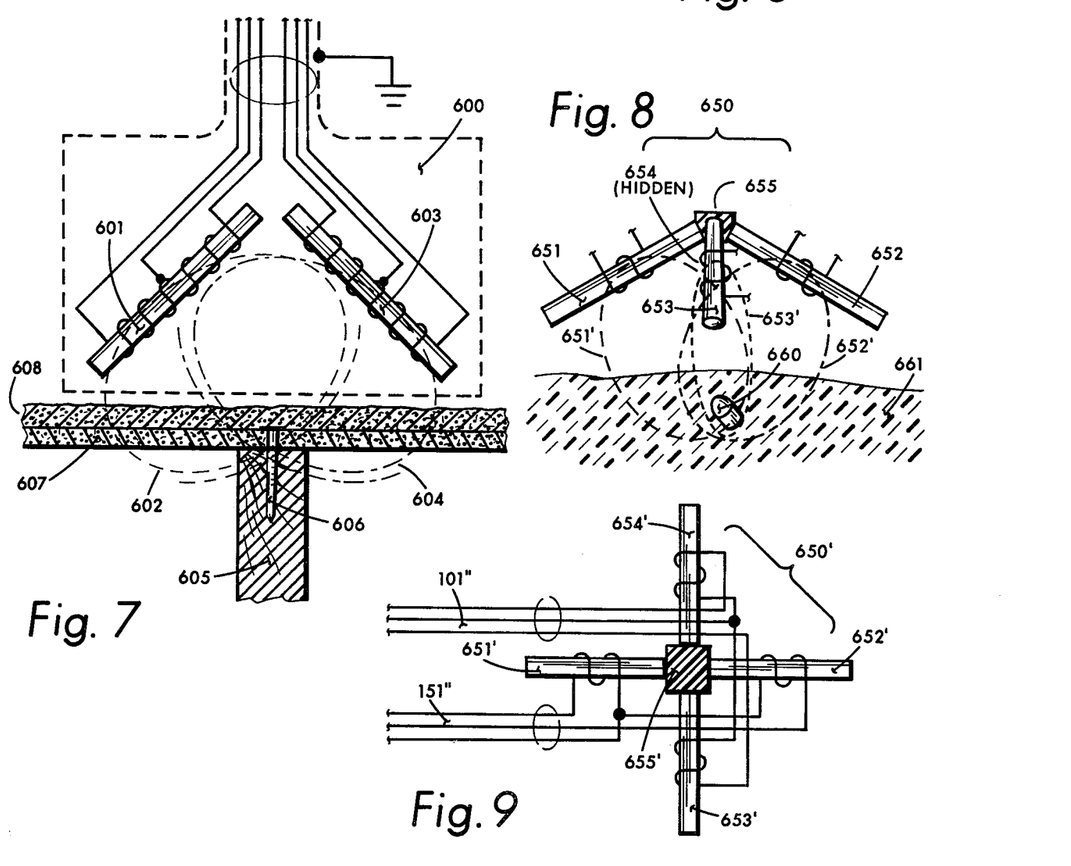
FIG. 7 Inducer for for use in locating concealed nails.
FIG. 8 Inducer form for use in locating bullet or like object in flesh or like concealment.
FIG. 9 View showing spider-like inducer arrangement and connection.

FIG. 7 illustrates one form my inducers may take, wherein the open loop configuration is supplanted by a solenoid-type winding, preferably supported on a core of improved permeability material, say powdered iron or ferrite. The view shows the axes of the inducers 601, 603 arranged at some oblique angle, which I have observed serves to enhance resolution for some categories of application for my invention. The inducers are shown in a shielded containment 600, whereby the emanatory fields 602, 604 are interactive with a nail 606 supported in a wood stud 605 in combination with a sheathing 607, whereby the position of the nail is concealed by the overcovering 608, say plaster or the like.

FIG. 8 shows yet another embodiment for my inducer means 650 as incorporated in the instant invention. The illustrative purpose is to locate a foreign object 660, say a bullet or shrapnel, lodged in a medium 661, say human flesh or the like. In this arrangement, inducers 651, 652 are collectively connected to act as a first field source, whilst inducers 653, 654 are collectively connected to act as a second field source. The inducers are all preferably formed at some angular axes relationship, as taught in FIG. 7, so as to enhance resolution. A hub 655 holds the inducers in a fixed spider-like arrangement.

FIG. 9 is another view of the arrangement described for FIG. 8 particularly showing the spider-like arrangement and providing detail for the collectively connected inducer windings.

Figures 10, 11:
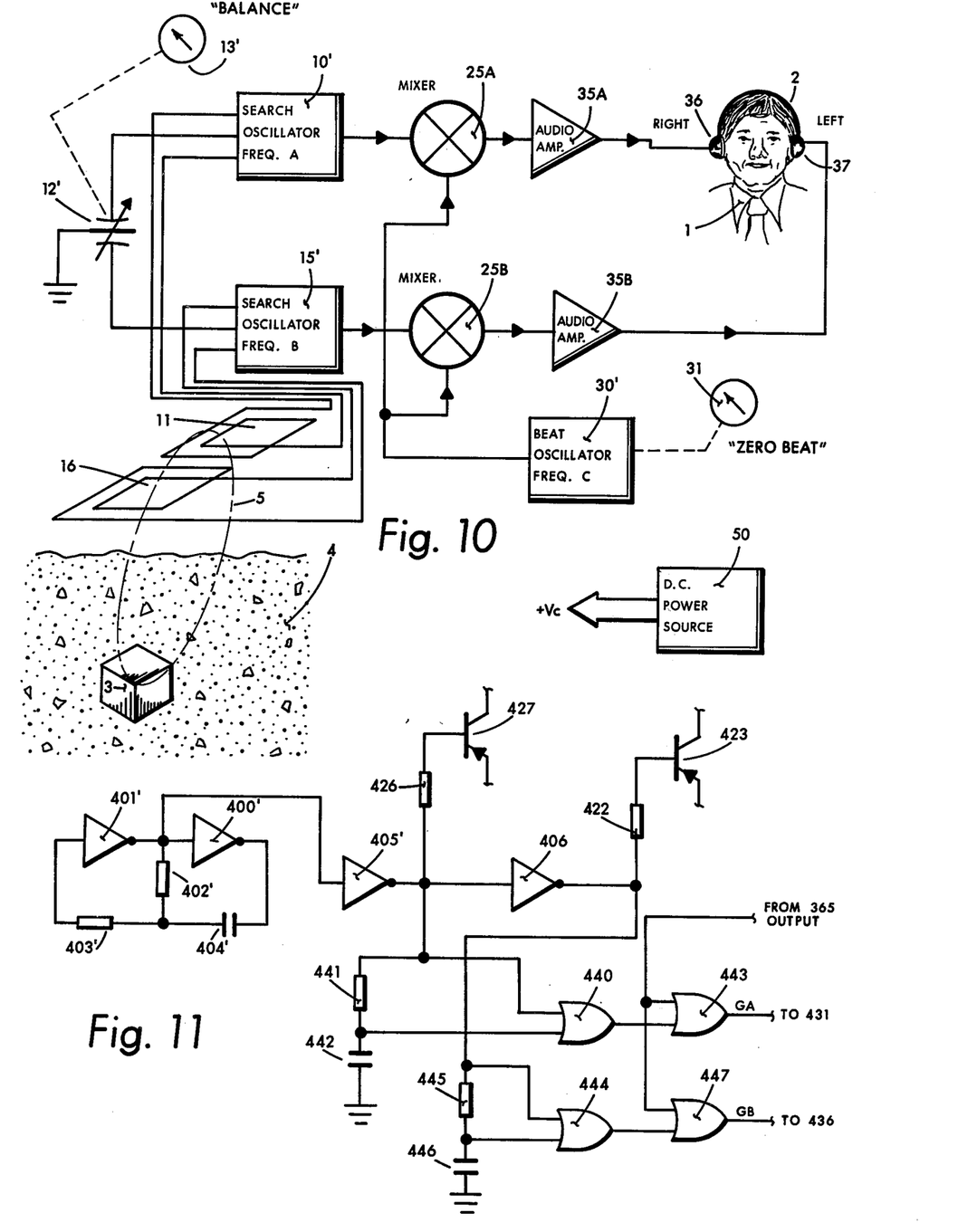
FIG. 10 Block diagram for locator with separate left and right circuits.
FIG. 11 Circuit for gate driver means using time constant circuits.

In FIG. 10 a variant embodiment of my instant invention is shown wherein the LEFT and RIGHT signals are processed through separate channels. The RIGHT inducer 11 and LEFT inducer 16 are coupled to first frequency signal search oscillator 10' and second signal oscillator 15', as described precedingly. The output of each search oscillator 10', 15' is coupled to a first input port on separate heterodyne detectors, or mixers, 25A, 25B. The second input port of each mixer connects to the common third frequency signal beat oscillator 30'. The fourth frequency signal output port of mixer 25A couples to audio amplifier 35A, the output of which typically drives RIGHT earphone 36. The fifth frequency signal output port of mixer 25B couples to audio amplifier 35B, the output of which typically drives LEFT earphone 37.

FIG. 11 gives illustration of an alternative embodiment of the sixth frequency gate oscillator and gate driver means shown in earlier FIG. 2. The sixth signal oscillator consists of inverters 400', 401', operating around 1-2 hertz as determined by capacitor 404', and resistors 402', 403'. The oscillator drives buffer inverter 405' the output of which drives switch transistor 427, second buffer inverter 406, and combinative OR-gate 440, say tape CD-4071. When the output of inverter 405', having been logic "1", goes logic "0", switch 427 will turn "ON", and one input of gate 440 will be immediately enabled, whereas the second gate 440 input will remain disabled, and enable only when capacitor 442 is discharged through resistor 441 to the logic "0" level. The time constant "t" is chosen to be about 10%, more or less, of the half-cycle period of the said sixth frequency, i.e.:

$$t_{RC} = 0.05 \, (1/f_c)$$

where:
R = resistor 441 (or else 445),
C = capacitor 442 (or else 446), and
$f_c$ = sixth signal frequency.

The result is gate 440 will be delayed in "turn on" until both inputs are logic "0", which results in a delay of the enablement of gate 440, resulting in a like delay in the enablement of gate 443 and the passage therethrough of the fifth frequency signal.

Alternatively, when the output of inverter 405', having been logic "0", goes logic "1", switch 427 will turn "OFF", and one input of gate 440 will promptly go high, disabling the gate irrespective of the condition of the other input, and thereby disable subsequent gate 443. Meanwhile capacitor 442 will charge through resistor 441.

Through inversion of the output of buffer 405', the output of inverter 406 serves to operate on switch transistor 423, OR-gate 444, and delay network 445, 446 so as to retard the enablement of OR-gate 447 and the sixth frequency signal which is acted upon by gate 447. The effect is to delay the fifth and sixth frequency signals so as to eliminate "chirp" from the resultant outputs.

While I have detailedly described the instant invention as apparatus suited for the locating of a metal, or metallike, object buried in soil; as apparatus suited for locating a metal object, say a nail, in a construction, say a building wall; and, as apparatus for locating a bullet or like object lodged in human flesh or like concealment, these descriptions serve merely to illustrate the diversity of application for which the device may find utility and shall not serve to limit the use of the apparatus in any other applicatory task.

While I have detailedly described the instant invention in a form which is generally portable and presumedly hand-carried by an operator, the obvious utilization of the described means, in part or in whole, in some variation thereof, as a part of a vehicular machine, flying machine, or watercraft is considered part of the scope of the description.

While the instant invention is described to cooperatively locate a metal object which is obscured in some manner, the practical application, which enhances the utility thereof, includes the location of any more conductive substance which is covertly contained in a less conductive medium, which is to say the device, in whole or in part, in some variant form is not solely limited as a metal locator alone.

While the description portrays the use of certain circuit forms and certain components therein, the scope of the invention is not limited in any way by these choices, but rather the examples are given merely to enable an artisian to more fully understand the operation and the utilitarian merit of the invention.

What is claim is:

1. Apparatus for the positional bearing localization of a metal object concealed in a covert medium, comprising a directional acting means usually providing a right or left indication and including in operative combination:
   a. a plurality of radiant field producing electromagnetic field effectors purposefully arranged in independent axes dissimilitude, being jointly positionable so as to cause the therefrom emanated separate acting radiant fields to be variously influenced in character by the presence of a concealed metal object which results in a measurable change in the electrical value of the said field effector and wherein such influence will be directly proportionate to the proximal substantially translateral relationship between each effector and the sought object;
   b. a plurality of search frequency signal generative means each of which is coupled to at least one of the said plural field effectors, wherein the individual search signal periodicity, or frequency rate, is caused to deviate in direct proportion to the said effector electrical value variations;
   c. beat frequency signal generative means providing a source of beat signal which is effectively common to each search signal, including output therefrom;
   d. heterodyne detector, say mixer, means including a plurality of first input ports each of which is coupled to at least one of the said plural search frequency signal means outputs, further including at least one second input port coupled to a common acting said beat signal output which provides substantially the same beat frequency effect for each said search frequency input, whereby the said detector includes output port means operative to yield at least a plurality of difference frequency signals resulting from the effectively separate heterodyne mixing of each of the said plural search frequency signals with the said common beat frequency signal;
   e. plural amplifier means coupled to said detector output port means, whereby each constituent amplifier is principally responsive to usually but one of the said mixer said difference frequency signal combinations, including output therefrom; and,
   f. plural directionally indicant means coupled to said amplifier means output whereby at least two signals result therefrom which will provide information to an operator which is significative of the position of the said concealed metal object in relation to the said plural field effectors.

2. Apparatus of claim 1 wherein more particularly the directional acting means further includes:
   a. plural search frequency signal generative means effectively operating at least at a first signal frequency and a second signal frequency;
   b. beat frequency signal generative means operating at an effectively common third signal frequency;
   c. at least one of the said mixer said plural first input ports effectively coupled to the said first frequency signal;
   d. at least one of the said mixer said plural first input ports effectively coupled to the said second frequency signal;
   e. the said mixer said second input port effectively coupled to the common third frequency signal produced by the said beat frequency generative means;
   f. the said mixer operative to produce at the said output port means at least a fourth frequency signal and a fifth frequency signal, wherein the said fourth signal is the combinative difference of the said first and common third signals, and wherein the said fifth signal is the combinative difference of the said second and common third signals.

3. Apparatus as in claim 2 wherein more particularly the directional acting means is provided further improvement in the comparison of the said fourth signal and said fifth signal through alternate coupling of each said signal to the directional indicant means, including:
   a. a sixth frequency gate signal generative means;
   b. gate signal first switch means coupled to said sixth signal means and operative therewith to alternately effect the purposeful operation of the said first frequency signal generative means and the said second frequency signal generative means in reiterative sequence;
   c. combinative means coupled to the alternant said first and said second frequency signal means and effectively operative to couple the said signals into the said mixer said first input port;
   d. gate signal second switch means coupled to said sixth signal means and to the said mixer said output port means and operative therewith to alternatingly steer the resulting fourth signal and fifth signal each to a separate indicant output terminus and thereby provide:
  da. at one indicant output therefrom a signal indicative of the first position relationship between the field effectors and the metal object; and,
  db. to provide at yet another indicant output a signal indicative of the second position relationship between the field effectors and the metal object.

4. In a concealed metal object locator apparatus, having utility for the positional localization of the said object by way of a directional acting means which usually provides a right or left indication of the relationship between the apparatus and the object and therefor comprising in substantially composite, singular acting operative combination:
  a. a source of first frequency signal, including:
    aa. first frequency oscillator means; and
    ab. first radiant energy field emitting means connected thereto whereby a metal object appearing in the first radiated field therefrom will serve to cause a deviation in the periodicity of the said first frequency oscillator means;
  b. a source of second frequency signal, including:
    ba. second frequency oscillator means, and,
    bb. second radiant energy field emitting means connected thereto, further arranged with some spatial radiated field displacement with respect to the said first radiant energy emitting means, whereby a metal object appearing in the second radiated field therefrom will serve to cause a deviation in the periodicity of the said second frequency oscillator means;
  c. a source of common third frequency signal including a third frequency oscillator means;
  d. combinative means including a heterodyne detector, say mixer, including at least two first input ports, at least usually but one common second input port, and at least one output port and having:
    da. at least one said first input port coupled to said source of first signal output, whilst said common second input port couples to the said common source of third signal output, thereby producing a fourth frequency signal, which is the combinative issue thereof, at the said output port;
    db. at least one said first input port coupled to said source of second signal output, whilst said common second input port couples to the said common source of third signal output, thereby producing a fifth frequency signal, which is the combinative issue thereof, at the said output port;
  e. indicant means coupled to said output port, which is operatively responsive to the said fourth signal output so as to produce a first telltale sensory signification therefrom which is proportional to the said first signal periodicity deviations and thereby acts so as to give indication to an operator as to the relative first positional relationship between the said first radiant energy field emitting means and the said concealed object; and,
  f. indicant means coupled to said output port, which is operatively responsive to the said fifth signal output so as to produce a second telltale sensory signification therefrom which is proportional to the said second signal periodicity deviations and acts so as to give indication to an operator as to the relative second positional relationship between the said second radiant energy field emitting means and the said concealed object.

5. Locator apparatus as in claim 4 wherein the said first frequency oscillator means and the said second frequency oscillator means each include a frequency determining network principally consisting of inductance and capacitance, wherein further respective said capacitances include in part a differential capacitor, so to say, a dual variable capacitor wherein one section thereof cooperates with the first frequency oscillator and, further, wherein a second section thereof cooperates with the second frequency oscillator, whereby the differential action of the capacitor is such that when the setting thereof is varied the capacitance of one section decreases in proportion to any increase in capacitance introduced into the other section.

6. Locator apparatus as in claim 4 wherein the said first frequency oscillator means and the said second frequency oscillator means each include a frequency determining network principally consisting of inductance and capacitance, wherein further respective said capacitances each include in part a variable capacitance diode, say tuning diode, wherein each said diode is reverse biased so as to effect an electrically variable capacitance, wherein further the said bias is derived from a potentiometric source of voltage so arranged as to be variably operative to provide an increasing bias voltage across one tuning diode when the bias voltage across the other tuning diode is decreasing, the resultant effect being that to cause the diode capacitance for one oscillator tuning network to decrease in proportion to any diode capacitance increase in the other oscillator tuning network.

7. Locator apparatus as in claim 4 wherein the said common third frequency oscillator means is operative so as to be variable in frequency the purpose for which is to provide a so-called "zero" function, that being a condition whereby the third frequency may be adjusted so as to cause the said mixer to produce fourth and fifth frequencies therefrom which various ratios of frequency relationship, the purpose for which is in part to serve as means to improve the recognizability of any relatively small frequency difference between the said fourth and said fifth frequencies.

8. Locator apparatus as in claim 4 including a binaural headset comprising two separate acting earphones for the operator's right and left ear; wherein one said earphone serves as the said indicant means coupled to said fourth signal output, wherein further, the other said earphone serves as the said indicant means coupled to the said fifth signal output thereby producing for the operator a sensory indication of at least relative right-hand or else left-hand proximateness between the said operator and the concealed object.

9. Locator apparatus as in claim 4 further including in combination:
  a. a sixth frequency oscillator means;
  b. a gate switch driver coupled to said oscillator means, including:
    ba. a first output which is principally operative on sixth frequency alternate half cycles;
    bb. a second output which is principally operative in alternation with the said first output, whereby the second output is operative when the first output is inoperative;
    bc. a third output which is principally operative coincident with the said first output;

bd. a fourth output which is principally operative coincident with the said second output;

c. a first frequency signal output enabling means coupled to said driver first output;

d. a second frequency signal output enabling means coupled to said driver second output;

e. a fourth frequency signal output enabling means coupled to said driver third output;

f. a fifth frequency signal output enabling means coupled to said driver fourth output;

wherein the purposeful operation is such that the first and second signal outputs will be enabled in an alternating reiterative sequence; wherein further, when the first signal output is enabled the fourth frequency signal output will also be enabled for a goodly part of the same period thereby providing a signal to the fourth signal indicant means; wherein further, when the second signal output is enabled the fifth frequency signal output will also be enabled for a goodly part of the same period thereby providing a signal to the fifth signal indicant means; wherein further, such alternant output states will be repetitious at the said sixth frequency signal rate.

10. Locator apparatus as in claim 9 wherein:

a. the duration of the said driver said third output operative period is measurably less than the said driver said first output operative period;

b. the duration of the said driver said fourth output operative period is measurably less than the said driver said first output operative period;

c. the said driver said first output operative period commences prior to the said driver said third output operative period;

d. the said driver said second output operative period commences prior to the said driver said fourth output operative period;

the purpose being to permit the said first and said second frequency signals to stabilize before the said fourth frequency signal and said fifth frequency signal are coupled to the respective indicants, thereby preventing the period of instability, referred to as "chirp", from affecting the indicant response signal.

* * * * *

UNITED STATES PATENT AND TRADEMARK OFFICE
CERTIFICATE OF CORRECTION

PATENT NO. : 4,196,391
DATED : April 1, 1980
INVENTOR(S) : Harold J. Weber

It is certified that error appears in the above-identified patent and that said Letters Patent are hereby corrected as shown below:

Col. 1, Line 58: "oil" should read ---coil---

Col. 3, Line 35: "drive" should read ---driver---

Col. 7, Line 9: "in" should read ---is---

Col. 8, Line 7: "shrapnet" should read ---shrapnel---

Col. 12, Line 41: (part of Claim 7) "which" should read ---with---.

Signed and Sealed this

Fifteenth Day of July 1980

[SEAL]

Attest:

SIDNEY A. DIAMOND

Attesting Officer

Commissioner of Patents and Trademarks